United States Patent
Archuleta

(10) Patent No.: US 9,267,334 B2
(45) Date of Patent: Feb. 23, 2016

(54) ISOLATOR SUB

(71) Applicant: Jacobo Rogelio Archuleta, Santa Fe, NM (US)

(72) Inventor: Jacobo Rogelio Archuleta, Santa Fe, NM (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 14/284,988

(22) Filed: May 22, 2014

(65) Prior Publication Data

US 2015/0337604 A1 Nov. 26, 2015

(51) Int. Cl.
*E21B 17/00* (2006.01)
*E21B 47/12* (2012.01)
*F16L 25/02* (2006.01)

(52) U.S. Cl.
CPC ............ *E21B 17/003* (2013.01); *E21B 47/122* (2013.01); *F16L 25/02* (2013.01)

(58) Field of Classification Search
CPC ..... E21B 17/003; E21B 17/028; E21B 17/04; E21B 17/0423; E21B 47/122; H01R 4/00; H01R 4/60; H01R 11/00; F16L 25/02
USPC .............................. 285/47, 48, 50; 340/854.4
See application file for complete search history.

(56) References Cited

U.S. PATENT DOCUMENTS

| | | | |
|---|---|---|---|
| 4,308,499 A | 12/1981 | Thierbach et al. | |
| 4,981,173 A | 1/1991 | Perkins | |
| 6,098,727 A * | 8/2000 | Ringgenberg et al. | 175/325.2 |
| 6,515,592 B1 * | 2/2003 | Babour et al. | 340/854.4 |
| 6,633,236 B2 | 10/2003 | Vinegar et al. | |
| 6,766,141 B1 | 7/2004 | Briles et al. | |
| 7,158,049 B2 | 1/2007 | Hoefel et al. | |
| 2002/0126021 A1 | 9/2002 | Vinegar | |
| 2003/0047317 A1 | 3/2003 | Powers | |
| 2003/0227393 A1 * | 12/2003 | Vinegar et al. | 340/854.3 |

(Continued)

FOREIGN PATENT DOCUMENTS

| | | |
|---|---|---|
| EP | 0721053 | 7/1996 |
| EP | 1193368 | 4/2002 |

(Continued)

OTHER PUBLICATIONS

Schlumber Oilfield Glossary "Casing"; http://www.glossary.oilfield.slb.com/en/Terms/c/casing.aspx.*

(Continued)

*Primary Examiner* — Blake Michener
*Assistant Examiner* — Christopher Sebesta
(74) *Attorney, Agent, or Firm* — King & Spalding LLP

(57) ABSTRACT

An isolator sub is disclosed. The isolator sub can include a first rod having a first coupling feature disposed at a first end. The isolator sub can also include a second rod having a second coupling feature disposed at a first end, where the first rod is electrically conductive. The isolator sub can further include an isolator made of an electrically non-conductive material and having a first complementary coupling feature and a second complementary coupling feature, where the first coupling feature couples to the first complementary coupling feature, and where the second coupling feature couples to the second complementary coupling feature. The isolator sub can also include an outer housing coupled to the first rod, the second rod, and the isolator, where the outer housing is electrically conductive and has at least one third coupling feature configured to electrically couple to an electrical cable.

20 Claims, 11 Drawing Sheets

(56) References Cited

U.S. PATENT DOCUMENTS

| | | | |
|---|---|---|---|
| 2004/0104047 A1* | 6/2004 | Peter | 175/40 |
| 2005/0051334 A1 | 3/2005 | Baugh | |
| 2007/0235184 A1 | 10/2007 | Thompson et al. | |
| 2008/0253230 A1 | 10/2008 | Thompson et al. | |
| 2009/0050374 A1* | 2/2009 | Spiecker et al. | 175/66 |
| 2009/0159361 A1 | 6/2009 | Coates et al. | |
| 2009/0174409 A1 | 7/2009 | Coates et al. | |
| 2011/0037004 A1 | 2/2011 | Lake | |
| 2011/0232921 A1* | 9/2011 | Hopmann et al. | 166/385 |
| 2011/0309949 A1* | 12/2011 | Dopf et al. | 340/854.6 |

FOREIGN PATENT DOCUMENTS

| | | |
|---|---|---|
| GB | 2076039 | 11/1981 |
| GB | 2330598 | 4/1999 |
| GB | 2461065 | 12/2009 |
| WO | WO 80/00727 | 4/1980 |
| WO | WO 82/02754 | 8/1982 |
| WO | WO 97/16751 | 5/1997 |
| WO | WO 01/65061 | 9/2001 |

OTHER PUBLICATIONS

International Search Report for PCT/US2013/031526 mailed May 7, 2014.

International Search Report for PCT/US2011/060454 mailed Jan. 22, 2014.

International Search Report, mailed Dec. 18, 2014 for PCT/US2014/056385.

* cited by examiner

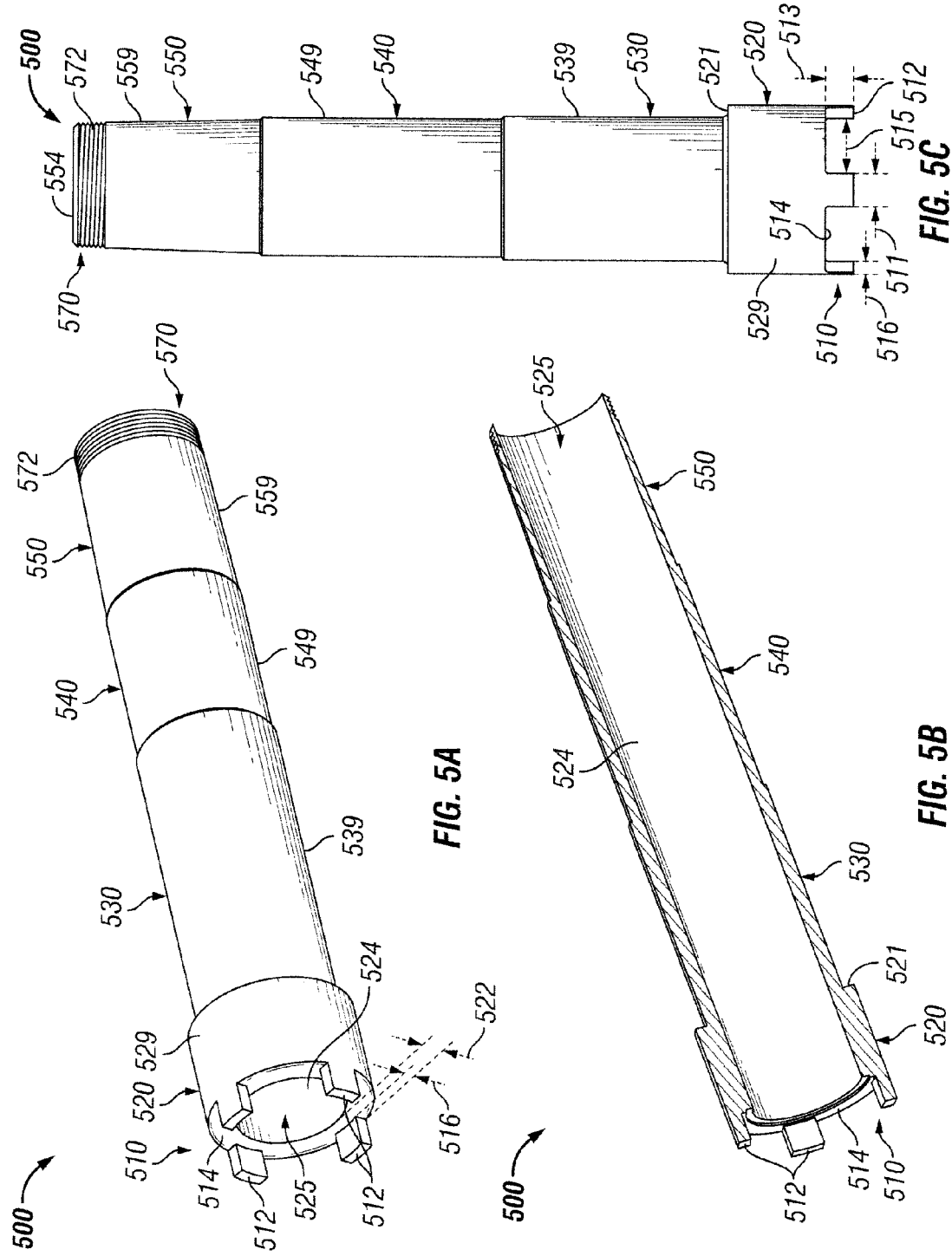

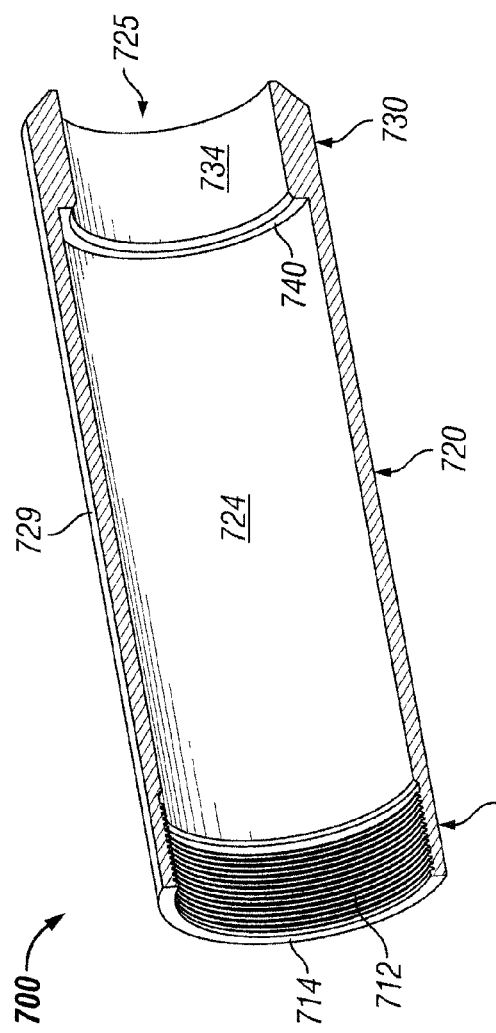
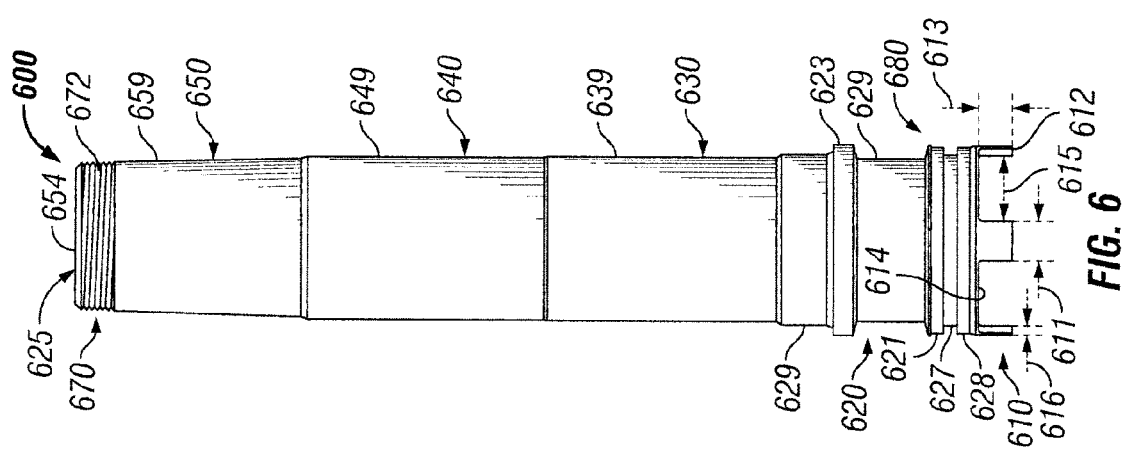

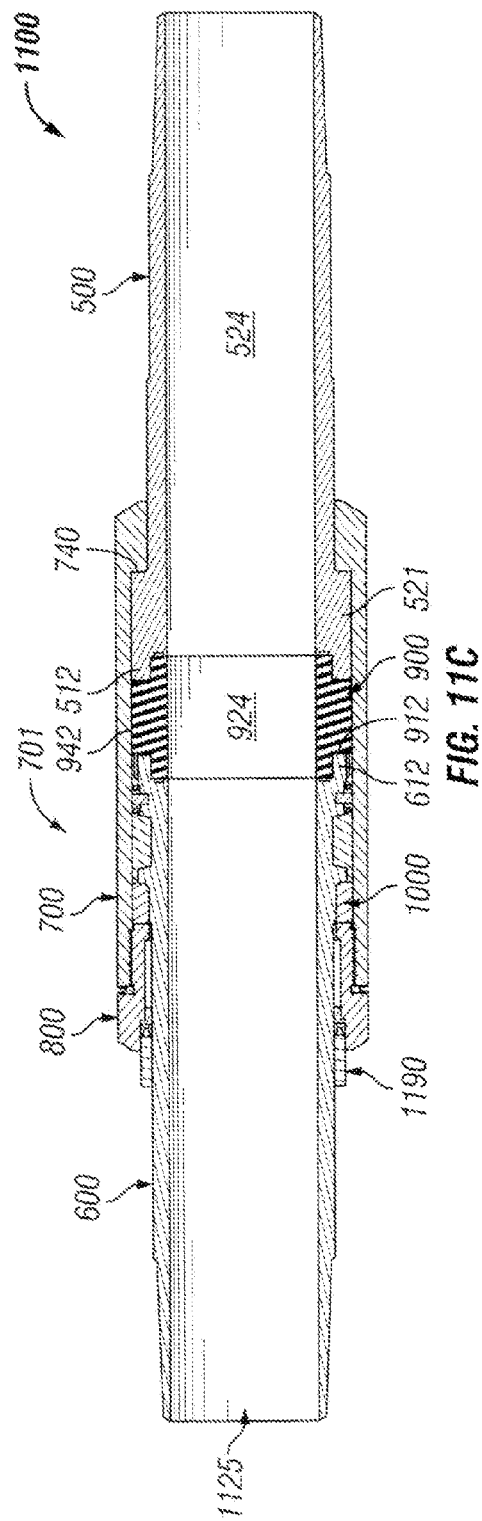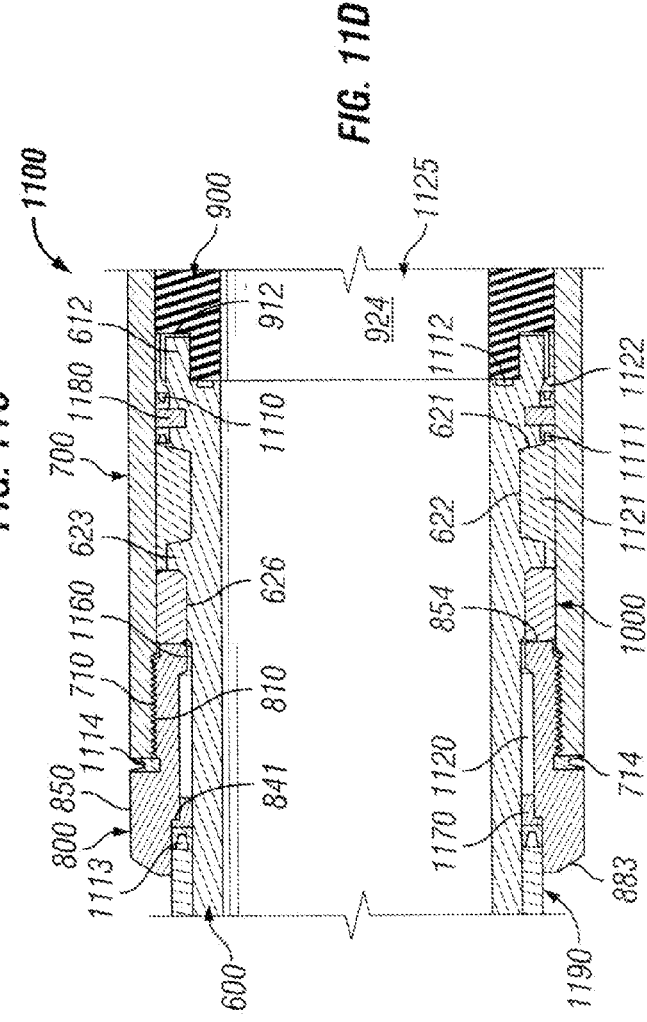

ISOLATOR SUB

CROSS-REFERENCE TO RELATED APPLICATION

The present application is related to International Application Number PCT/US2013/031526, titled "Transmitting Power Within a Wellbore," and filed on Mar. 14, 2013, the entire contents of which are hereby incorporated herein by reference.

TECHNICAL FIELD

The present disclosure relates generally to the application of electrical power into a subterranean wellbore.

BACKGROUND

In the production of oil and gas from a wellbore, it is sometimes necessary to employ pumps or other apparatus deep within the well for the purpose of pumping downhole fluids such as oil and gas vertically upwards for production from the wellbore. Such pumps and other apparatus use electrical power. Electrical devices can also be used in a wellbore for other purposes, such as measuring, monitoring, and reporting.

Subterranean wellbores may be drilled and constructed several miles below the ground or seabed. It is difficult or inconvenient to deliver electrical power to downhole equipment in such harsh environments. In some cases, electrical cables are installed in the wellbore, but such cables sometimes are difficult and expensive to install and maintain in an operationally secure manner. In addition, it can be difficult to install a cable in the confined space of a well for distances of several thousand feet from the surface to downhole power consuming devices. Additionally, such cables may become eroded or damaged during installation or during use. Such damage may require costly workovers and delays in oil and gas production.

SUMMARY

In general, in one aspect, the disclosure relates to an isolator sub for use in a wellbore of a subterranean formation. The isolator sub can include a first rod having at least one first rod wall forming a first rod cavity, where the first rod further includes a first coupling feature disposed at a first end. The isolator sub can also include a second rod having at least one second rod wall forming a second rod cavity, where the second rod further includes a second coupling feature disposed at a first end, where the first rod is electrically conductive. The isolator sub can further include an isolator made of an electrically non-conductive material and having at least one isolator wall, a first complementary coupling feature, and a second complementary coupling feature, where the at least one isolator wall forms an isolator cavity, where the first coupling feature couples to the first complementary coupling feature, and where the second coupling feature couples to the second complementary coupling feature. The isolator sub can also include an outer housing coupled to the first rod, the second rod, and the isolator, where the outer housing is electrically conductive and includes at least one third coupling feature, where the at least one third coupling feature is configured to electrically couple to an electrical cable.

In another aspect, the disclosure can generally relate to a system for applying power into a wellbore within a subterranean formation. The system can include a casing disposed within the wellbore having a first cavity running therethrough, where the casing is electrically conductive. The system can also include a tubing string disposed within the first cavity, where the tubing string includes a top neutral section positioned proximate to an entry point of the wellbore and a power-transmitting section positioned below the top neutral section. The system can further include a first isolator sub positioned between the top neutral section and the power-transmitting section of the tubing string. The first isolator sub of the system can include a first rod mechanically coupled to the top neutral section, where the first rod includes a first coupling feature disposed at a first distal end. The first isolator sub of the system can also include a second rod mechanically coupled to the power-transmitting section, where the second rod includes a second coupling feature disposed at a second proximal end, where the first rod is electrically conductive. The first isolator sub of the system can further include a first isolator made of an electrically non-conductive material and having a first complementary coupling feature and a second complementary coupling feature, where the first coupling feature couples to the first complementary coupling feature, and where the second coupling feature couples to the second complementary coupling feature. The first isolator sub of the system can also include a first outer housing coupled to the first rod, the second rod, and the first isolator, where the outer housing is electrically conductive and includes at least one third coupling feature. The system can also include a power source positioned above the entry point and electrically coupled to the outer housing using the at least one third coupling feature. The system can further include an electrical load electrically coupled to the power-transmitting section of the tubing string and disposed within the wellbore.

These and other aspects, objects, features, and embodiments will be apparent from the following description and the appended claims.

BRIEF DESCRIPTION OF THE DRAWINGS

The drawings illustrate only example embodiments of methods, systems, and devices for transmitting power within a wellbore (also called herein a "borehole") and are therefore not to be considered limiting of its scope, as transmitting power within a wellbore may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 5A-5C show various views of an end rod of an example isolator sub in accordance with one or more example embodiments.

FIG. 6 shows a side view of another end rod of an example isolator sub in accordance with one or more example embodiments.

FIG. 7 shows a perspective cross-sectional side view of an outer cylinder of an example isolator sub in accordance with one or more example embodiments.

FIGS. 11A-11D show various views of an example isolator sub in accordance with one or more example embodiments.

DETAILED DESCRIPTION OF EXAMPLE EMBODIMENTS

Figure 1:
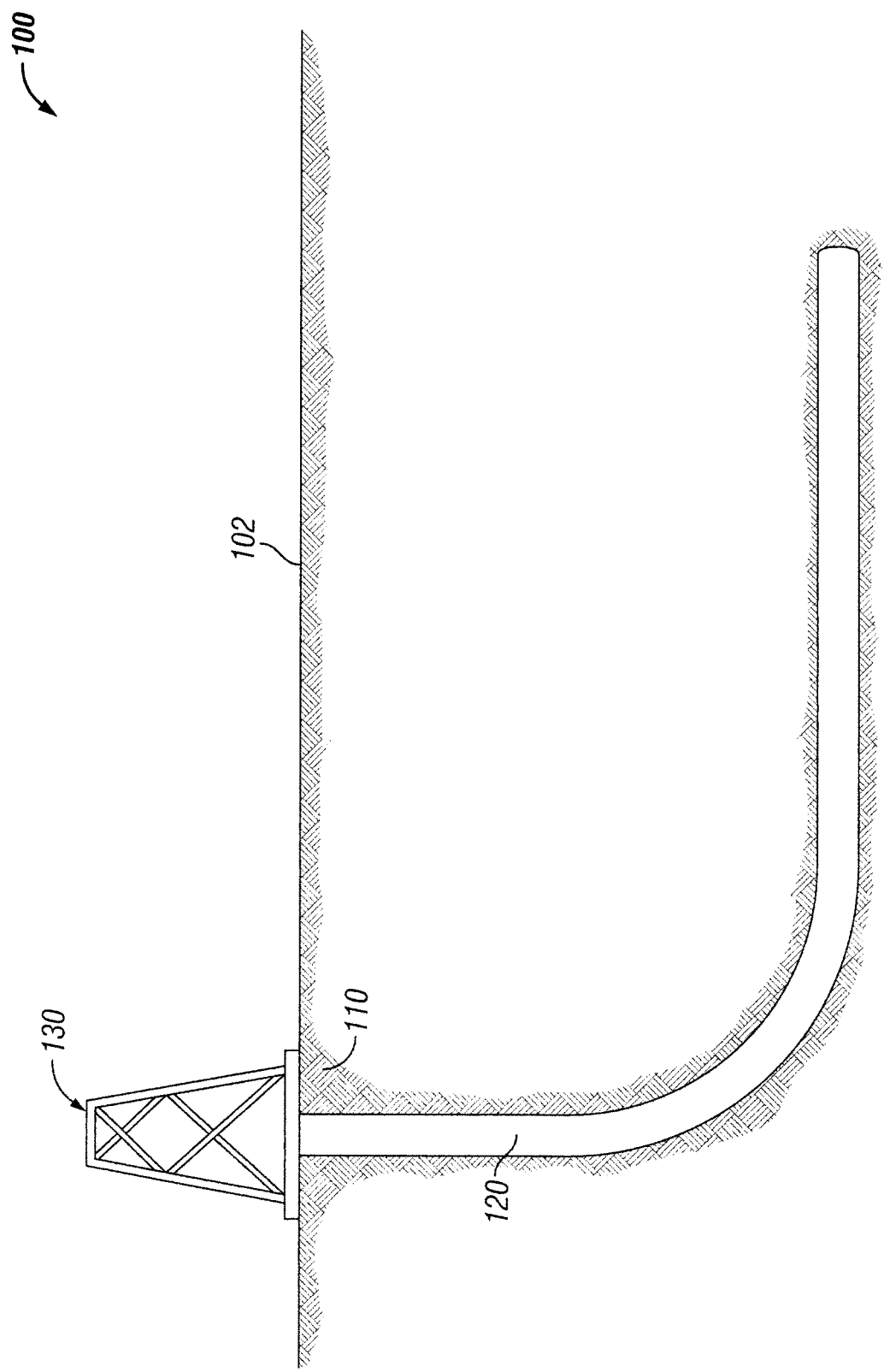
FIG. 1 shows a schematic diagram of a field system that can transmit power within a subterranean wellbore in accordance with certain example embodiments.

The example embodiments discussed herein are directed to systems, apparatuses, and methods of isolator subs. Example isolator subs can be used in one or more of a number of power transmission applications, including but not limited to instrumentation, power, and/or control. Thus, the examples of isolator subs described herein are not limited to certain levels of electrical load and/or power requirements.

Any components of an example isolator sub, or portions (e.g., features) thereof, described herein can be made from a single piece (as from a mold). When an example component of an isolator sub or portion thereof is made from a single piece, the single piece can be cut out, bent, stamped, and/or otherwise shaped to create certain features, elements, or other portions of a component. Alternatively, an example component of an isolator sub or portions thereof can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, aligning, retaining, or other similar terms. Such terms are merely meant to distinguish various elements and/or features within a component or device and are not meant to limit the capability or function of that particular element and/or feature. For example, a feature described as a "coupling feature" can couple, secure, fasten, align, retain, and/or perform other functions aside from merely coupling. In addition, each component and/or feature described herein can be made of one or more of a number of suitable materials, including but not limited to metal, rubber, and plastic.

A coupling feature (including a complementary coupling feature) as described herein can allow one or more components and/or portions of an isolator sub to become mechanically coupled, directly or indirectly, to another component and/or portion of the isolator sub and/or other portions of a piping system. A coupling feature can include, but is not limited to, a portion of a hinge, an aperture, a recessed area, a protrusion, a slot, a spring clip, a tab, a detent, and mating threads. One portion of an example isolator sub can be coupled to another portion of the isolator sub and/or another portion of a piping system by the direct use of one or more coupling features.

In addition, or in the alternative, a component of an isolator sub can be coupled to another component of the isolator sub and/or another portion of the piping system using one or more independent devices that interact with one or more coupling features disposed on a component of the isolator sub. Examples of such devices can include, but are not limited to, a pin, a hinge, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

In certain embodiments, it is necessary to consider the balance of voltage versus current for a given power requirement within the wellbore. A higher voltage and lower current density may be required. High voltage may impact the insulation systems, while high current may impact resistive losses, causing undesirable electric etching and heating in the interfaces or conductors. In some example embodiments, a significant effort can be made to operate the system voltage as high as possible to reduce the system current to a level that is as low as possible. High system current may result in a voltage gradient from wellhead to casing end on the outer surface of the casing, which is undesirable. However, it is recognized that many different voltage, amperage, and power requirements could be used with example embodiments, and that example embodiments are not limited to any particular voltage, amperage, or power values.

The case for higher system voltage (i.e., lower current) has advantages in certain example embodiments. The example isolator sub (described below) is an insulating short joint section, one of which can be located near the wellhead, that allows a break in metallic or conductor connection between its two ends. This allows the string tubing below the example isolator sub to be electrically insulated from the string tubing above the isolator sub. If another isolator sub is placed at the bottom of the tubing string in the wellbore, a portion of tubing string (the power-transmitting section of the tubing string, as defined below in FIG. 2) can be excited electrically to carry current to an electrical device (i.e., a pump, a motor) positioned within the wellbore. Systems using example embodiments can deliver higher voltages and/or currents to an electrical device within a wellbore.

Unless described otherwise, each component of an isolator sub described herein can be made of one or more of a number of electrically conductive materials. Further, each component of an isolator sub described herein can be made of one or more of a number of materials that are capable of withstanding high ambient temperatures (e.g., approximately 625° F.), capable of supporting high axial loads (e.g., approximately 200,000 pounds), capable of operating in the presence of toxic chemicals (e.g., hydrogen sulfide), and capable of withstanding high pressures (e.g., approximately 15,000 pounds). Examples of such materials can include, but are not limited to, steel and ceramic.

The names for each component of the example isolator sub are meant to merely identify each respective component, but are not meant to be limiting with respect to location, function, or in any other way. A user as described herein may be any person that is involved with a piping system in a subterranean wellbore and/or transmitting power within the subterranean wellbore for a field system. Examples of a user may include, but are not limited to, a roughneck, a company representative, a drilling engineer, a tool pusher, a service hand, a field engineer, an electrician, a mechanic, an operator, a consultant, a contractor, and a manufacturer's representative.

Example embodiments of isolator subs will be described more fully hereinafter with reference to the accompanying drawings, in which example embodiments of isolator subs are shown. Isolator subs may, however, be embodied in many different forms and should not be construed as limited to the example embodiments set forth herein. Rather, these example embodiments are provided so that this disclosure will be thorough and complete, and will fully convey the scope of grounding of electrical connectors to those of ordinary skill in the art. Like, but not necessarily the same, elements (also sometimes called components) in the various figures are denoted by like reference numerals for consistency. Terms such as "first," "second," "distal," "proximal," "perimeter," "top," and "bottom" are used merely to distinguish one component (or part of a component or state of a component) from another. Such terms are not meant to denote a preference or a particular orientation. As used herein, a depth, a length, a width, a height, and other similar terms can each generally be described as lateral directions.

FIG. 1 shows a schematic diagram of a field system 100 in which an isolator sub can be used to transmit power within a subterranean wellbore in accordance with one or more example embodiments. In one or more embodiments, one or more of the features shown in FIG. 1 may be omitted, added, repeated, and/or substituted. Accordingly, embodiments of a field system should not be considered limited to the specific arrangements of components shown in FIG. 1.

Referring now to FIG. 1, the field system 100 in this example includes a wellbore 120 that is formed in a subterranean formation 110 using field equipment 130 above a surface 102, such as ground level for an on-shore application and the sea floor for an off-shore application. The point where the wellbore 120 begins at the surface 102 can be called the entry point. The subterranean formation 110 can include one or more of a number of formation types, including but not limited to shale, limestone, sandstone, clay, sand, and salt. In certain embodiments, a subterranean formation 110 can also include one or more reservoirs in which one or more resources (e.g., oil, gas, water, steam) can be located. One or more of a number of field operations (e.g., drilling, setting casing, extracting downhole resources) can be performed to reach an objective of a user with respect to the subterranean formation 110.

The wellbore 120 can have one or more of a number of segments, where each segment can have one or more of a number of dimensions. Examples of such dimensions can include, but are not limited to, size (e.g., diameter) of the wellbore 120, a curvature of the wellbore 120, a total vertical depth of the wellbore 120, a measured depth of the wellbore 120, and a horizontal displacement of the wellbore 120. The field equipment 130 can be used to create and/or develop (e.g., extract downhole materials) the wellbore 120. The field equipment 130 can be positioned and/or assembled at the surface 102. The field equipment 130 can include, but is not limited to, a derrick, a tool pusher, a clamp, a tong, drill pipe, a drill bit, example isolator subs, tubing pipe, a power source, and casing pipe. The field equipment 130 can also include one or more devices that measure and/or control various aspects (e.g., direction of wellbore 120, pressure, temperature) of a field operation associated with the wellbore 120. For example, the field equipment 130 can include a wireline tool that is run through the wellbore 120 to provide detailed information (e.g., curvature, azimuth, inclination) throughout the wellbore 120. Such information can be used for one or more of a number of purposes. For example, such information can dictate the size (e.g., outer diameter) of a casing pipe to be inserted at a certain depth in the wellbore 120.

Figure 2:
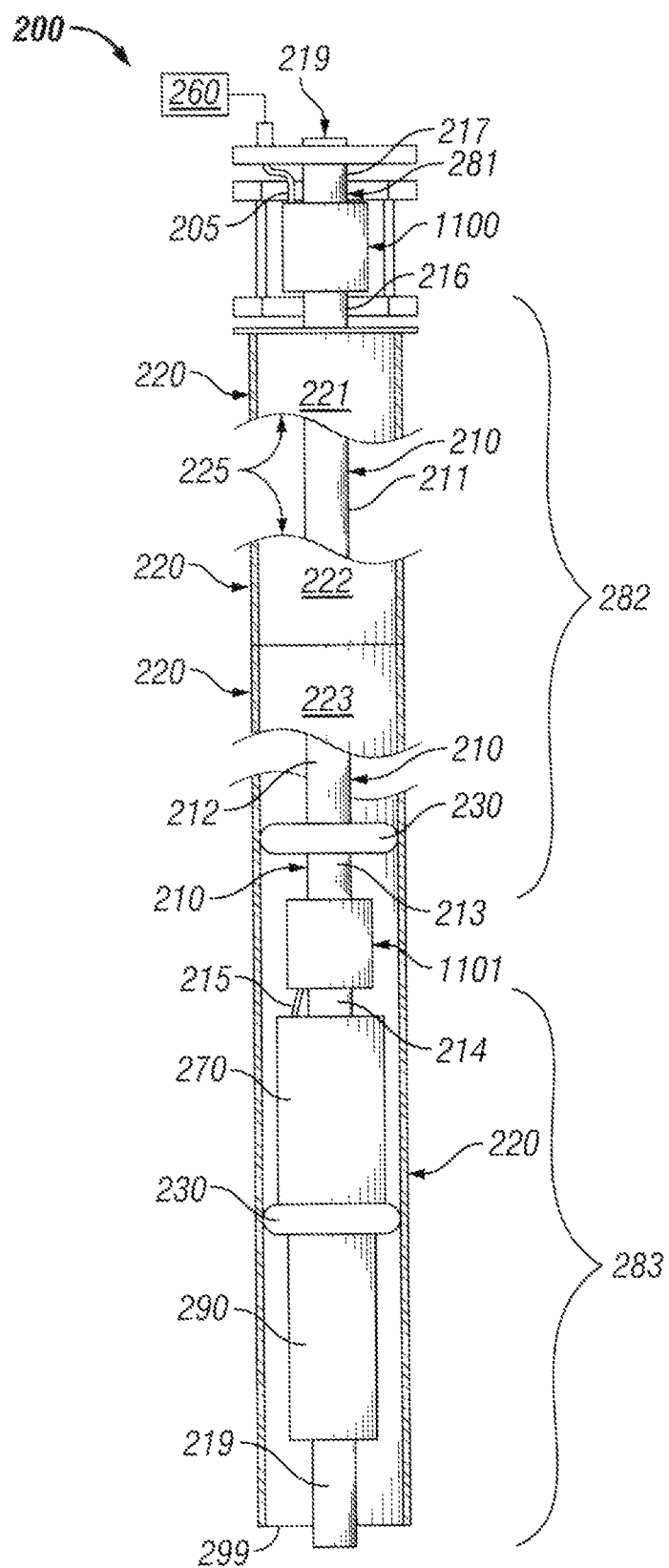
FIG. 2 shows a side view in partial cross section of a piping system within a wellbore of a field system in accordance with certain example embodiments.

FIG. 2 shows a side view in partial cross section of a piping system 200 within a wellbore of a field system in accordance with certain example embodiments. In one or more embodiments, one or more of the features shown in FIG. 2 may be omitted, added, repeated, and/or substituted. Accordingly, embodiments of a piping system should not be considered limited to the specific arrangements of components shown in FIG. 2.

Referring to FIGS. 1 and 2, the piping system 200 can include a casing 220, a tubing string 210, a power source 260, a top isolator sub 1100, a bottom isolator sub 1101, an optional power conditioner 270, an electrical device 290, a number of centralizers 230, and a conductive interface 299. The casing 220 can include a number of casing pipes (e.g., casing pipe 221, casing pipe 222, casing pipe 223) that are mechanically coupled to each other end-to-end using one or more of a number of coupling devices, usually with mating threads. The casing pipes of the casing 220 can be mechanically coupled to each other directly or using a coupling device, such as a coupling sleeve.

Each casing pipe of the casing 220 can have a length and a width (e.g., outer diameter). The length of a casing pipe can vary. For example, a common length of a casing pipe is approximately 40 feet. The length of a casing pipe can be longer (e.g., 60 feet) or shorter (e.g., 10 feet) than 40 feet. The width of a casing pipe can also vary and can depend on the cross-sectional shape of the casing pipe. For example, when the cross-sectional shape of the casing pipe is circular, the width can refer to an outer diameter, an inner diameter, or some other form of measurement of the casing pipe. Examples of a width in terms of an outer diameter can include, but are not limited to, 7 inches, 7⅝ inches, 8⅝ inches, 10¾ inches, 13⅜ inches, and 14 inches.

The size (e.g., width, length) of the casing 220 is determined based on the information gathered using field equipment 130 with respect to the wellbore 120. The walls of the casing 220 have an inner surface that forms a cavity 225 that traverses the length of the casing 220. The casing 220 can be made of one or more of a number of suitable materials, including but not limited to steel. In certain example embodiments, the casing 220 is made of an electrically conductive material. The casing 220 can have, at least along an inner surface, a coating of one or more of a number of electrically non-conductive materials. The thickness of such a coating can vary, depending on one or more of a number of factors, such as the imbalance in current density between the tubing string 210 and the casing 220 that must be overcome to maintain the electric circuit.

The tubing string 210 includes a number of tubing pipes (e.g., tubing pipe 211, tubing pipe 212, tubing pipe 213, tubing pipe 214, tubing pipe 219, tubing pipe 216, tubing pipe 217) that are mechanically coupled to each other end-to-end using one or more of a number of coupling devices, usually with mating threads. The tubing pipes of the tubing string 210 can be mechanically coupled to each other directly or using a coupling device, such as a coupling sleeve or an example isolator sub (e.g., top isolator sub 1100, bottom isolator sub 1101), described below. In some cases, more than one tubing string can be disposed within a cavity 225 of the casing 220.

Each tubing pipe of the tubing string 210 can have a length and a width (e.g., outer diameter). The length of a tubing pipe can vary. For example, a common length of a tubing pipe is approximately 30 feet. The length of a tubing pipe can be longer (e.g., 40 feet) or shorter (e.g., 10 feet) than 30 feet. The width of a tubing pipe can also vary and can depend on one or more of a number of factors, including but not limited to the inner diameter of the casing pipe. For example, the width of the tubing pipe is less than the inner diameter of the casing pipe. The width of a tubing pipe can refer to an outer diameter, an inner diameter, or some other form of measurement of the tubing pipe. Examples of a width in terms of an outer diameter can include, but are not limited to, 7 inches, 5 inches, and 4 inches.

Two tubing pipes (e.g., tubing pipe 216 and tubing pipe 217, tubing pipe 213 and tubing pipe 214) of the tubing string 210 can be mechanically coupled to each other using an isolator sub (e.g., top isolator sub 1100, bottom isolator sub 1101, respectively). In such a case, the tubing string 210 can be divided into segments. For example, as shown in FIG. 2, the portion (e.g., tubing pipe 217) of the tubing string 210 located above the top isolator sub 1100 can be called the top neutral section 281, and the portion (e.g., tubing pipe 214, tubing pipe 219) of the tubing string 210 located below the bottom isolator sub 1101 can be called the bottom neutral section 283. As another example, the portion (e.g., tubing pipe 211, tubing pipe 212, tubing pipe 213) of the tubing string 210 located between the top isolator sub 1100 and the bottom isolator sub 1101 can be called the power-transmitting section 282.

The size (e.g., outer diameter, length) of the tubing string 210 is based, at least in part, on the size of the cavity 225 within the casing 220. The walls of the tubing string 210 have an inner surface that forms a cavity 219 that traverses the length of the tubing string 210. The tubing string 210 can be made of one or more of a number of suitable materials, including but not limited to steel. The one or more materials of the tubing string 210 can be the same or different than the materials of the casing 220. In certain example embodiments, the tubing string 210 is made of an electrically conductive material. However, the tubing string 210 should not "electrically" contact the casing 220, so that the circuit is maintained. The tubing string 210 can have, at least along an outer surface, a coating of one or more of a number of electrically non-conductive materials. In such a case, the coating of an electrically insulating material can be thick and rugged so as to complete the 'insulation' system for the necessary voltage requirement of a given application.

The power source 260 can be any device (e.g., generator, battery) capable of generating electric power that can be used to operate the electrical device 290, described below. In certain example embodiments, the power source 260 is electrically coupled to the tubing string 210. Specifically, the power source 260 can be coupled to a portion of the power-transmitting section 282 of the tubing string. The power source 260 can be electrically coupled to the tubing string 210 using one or more electrical conductors (e.g., a cable). For example, as shown in FIG. 2, cable 205 can be used to electrically couple the power source 260 to the top end of the top isolator sub 1100. In certain example embodiments, cable 205 is capable of maintaining a high current density connection between the power source 260 and the power-transmitting section 282 of the tubing string 210. In certain example embodiments, high current densities are needed when higher voltages cannot be accommodated safely or reliably.

As an example, in 10,000 foot wellbore 120, the total string (tubing string 210 and casing 220) resistance can be approximately 3 Ohms. If the current that is required by the electrical device 290 is 100 amperes, then the power source 260 must provide 300 volts (100 A×3 Ω=300 V) above that used by the electrical device 290. The reason that an extra 300 V is needed is because the 300 V is lost to the tubing string 210 and the casing 220, and so the electrical device 290 does not receive the 300 V. In view of these losses caused by the tubing string 210 and the casing 220, an electrical device 290 using a high (e.g., 1000 A) amount of amperage may be beyond a practical application as the voltage loss (e.g., 3000V) through the tubing string 210 and the casing 220 may exceed practical electrical and/or hardware configurations.

The power generated by the power source 260 can be alternating current (AC) power or direct current (DC) power. If the power generated by the power source 260 is AC power, the power can be delivered in one phase. The power generated by the power source 260 can be conditioned (e.g., transformed, inverted, converted) by a power conditioner (not shown in FIG. 2, but similar to the power conditioner 270 described below) before being delivered to the tubing string 210. In certain example embodiments, one pole (e.g., the "hot" leg of a single phase AC current) of the power generated by the power source 260 can be electrically coupled to the tubing string 210, while another pole (e.g., the neutral leg of a single phase AC current) can be electrically coupled to the casing 220. In such a case, a complete circuit can be created between the tubing string 210 and the casing 220, using other components of the piping system 200 described below.

In certain example embodiments, the top isolator sub 1100 is positioned between, and mechanically coupled to, the top neutral section 281 of the tubing string 210 and the power-transmitting section 282 of the tubing string 210. In such a case, the top isolator sub 1100 electrically isolates (or electrically separates) the top neutral section 281 of the tubing string 210 from the power-transmitting section 282 of the tubing string 210. In addition, the top isolator sub 1100 can electrically isolate the casing 220 from the tubing string 210. An amount of voltage and/or current generated by the power source 260 (described below) can, in part, determine the size and/or features of the top isolation sub 1100 that is used for a given application.

In certain example embodiments, the top isolator sub 1100 has a cavity 525 (shown in FIGS. 5A and 5B) that traverses therethrough. In such a case, the cavity 525 of the top isolator sub 1100 can be substantially the same size as the cavity 219 of the tubing string 210. Thus, when the top isolator sub 1100 is positioned between and mechanically coupled to the top neutral section 281 of the tubing string 210 and the power-transmitting section 282 of the tubing string 210, a continuous passage traverses therethrough. Details of the top isolator sub 1100 are described below with respect to FIGS. 4A-10.

Similarly, in certain example embodiments, the bottom isolator sub 1101 is positioned between, and mechanically coupled to, the bottom neutral section 283 of the tubing string 210 and the power-transmitting section 282 of the tubing string 210. In such a case, the bottom isolator sub 1101 electrically isolates the bottom neutral section 283 of the tubing string 210 from the power-transmitting section 282 of the tubing string 210. In addition, the bottom isolator sub 1101 can electrically isolate the casing 220 from the tubing string 210. An amount of voltage and/or current generated by the power source 260 (described below) can, in part, determine the size and/or features of the bottom isolation sub 1101 that is used for a given application. Other factors that can affect the size and/or features of the bottom isolation sub 1101 can include, but are not limited to, the length of the power-transmitting section 282, the size (e.g., inner diameter, outer diameter) of the tubing string 210, and the material of the tubing string 210.

As with the top isolator sub 1100, the bottom isolator sub 1101 has a cavity that traverses therethrough. In such a case, the cavity of the bottom isolator sub 1101 can be substantially the same size as the cavity 219 of the tubing string 210. Thus, when the bottom isolator sub 1101 is positioned between and mechanically coupled to the bottom neutral section 283 of the tubing string 210 and the power-transmitting section 282 of the tubing string 210, a continuous passage traverses therethrough. Electrically, in certain example embodiments, an isolator sub (e.g., top isolator sub 1100, bottom isolator sub 1101) behaves like a dielectric break in an otherwise solid piece of the power-transmission section of the tubing string 210. In actual practice, such an isolator sub fits within the cavity 225 of the casing 220 with sufficient clearance from the walls of the casing 220, exhibits low end-to-end capacitance, and is able to standoff many hundreds of volts of applied potential. In certain example embodiments, the bottom isolator sub 1101 is substantially the same as, but oriented inversely within the piping system 200 relative to, the top isolator sub 1100.

In accordance with example embodiments, a technique for electrical isolation includes a ceramic and/or other electrically non-conductive insulator inserted in series with tubing pipes of the tubing string 210. This may be, for example, built-in to a section of pipe that is relatively short (e.g., 4 foot section) relative to the length of a tubing pipe. The word "sub" for the isolator subs described herein is used to designate that the length of an isolator sub, having such electrically non-conductive properties, can be of relatively short length. The electrically non-conductive (e.g., ceramic) portions of an isolator sub may be coupled to the electrically conductive portions of the isolator sub and/or the tubing string 210 without creating an electrical short in the isolator sub and/or the tubing string 210. An insulating coating may be applied to the internal and external surfaces of the tubing string 210 and/or the shell of an isolator sub as electrical breakdown protection across the gap between the tubing string 210 and the isolator sub.

An isolator sub (e.g., top isolator sub 1100, bottom isolator sub 1101) can be capable of withstanding one or more of a number of environmental conditions in the wellbore 120. In addition to supporting the weight of the remainder of the downhole portion of the piping system 200, an isolator sub can resist torque, torsion, bending, and/or any other force that could impact the mechanical integrity of the isolator sub. These latter characteristics are important for the bottom isolator sub 1101, which is mechanically coupled to the bottom neutral section 283 of the tubing string 210 and then gradually inserted further into the wellbore 120 as the various tubing pipes of the power-transmitting section 282 of the tubing string 210 is made up (mechanically coupled to each other using one or more of a number of coupling devices, commonly mating threads, which involves a rotational motion and force).

The optional power conditioner 270 can be disposed within the cavity 225 of the casing 220 proximate to the bottom isolator sub 1101. For example, as shown in FIG. 2, the power conditioner 270 can be located below the bottom isolator sub 1101. The power conditioner 270 can also be disposed outside of and/or integral with the tubing string 210. In such a case, the power conditioner 270 can have a feature substantially similar to the top isolator sub 1100 and the bottom isolator sub 1101 in that the power conditioner 270 can have a cavity that traverses therethrough. In such a case, the cavity of the power conditioner 270 can be substantially the same size as the cavity 219 of the tubing string 210. Thus, when the power conditioner 270 is positioned between and mechanically coupled to portions (e.g., tubing pipe 214, tubing pipe 219) of the bottom neutral section 283 of the tubing string 210, a continuous passage traverses therethrough.

In certain example embodiments, the power conditioner 270 is electrically coupled to the tubing string 210. Specifically, the power conditioner 270 can be coupled to a portion of the power-transmitting section 282 of the tubing string 210. The power conditioner 270 can be electrically coupled to the tubing string 210, for example, using one or more electrical conductors (e.g., a cable). For example, as shown in FIG. 2, cable 215 can be used to electrically couple the power conditioner 270 to the bottom end of the bottom isolator sub 1101. In certain example embodiments, cable 215 is capable of maintaining a high current connection between the power conditioner 270 and the power-transmitting section 282 of the tubing string 210.

The power received by the power conditioner 270 can be the same type of power (e.g., AC power, DC power) generated by the power source 260. The power received by the power conditioner 270 can be conditioned (e.g., transformed, inverted, converted) into any level and/or form required by the electrical device 290 before being delivered to the electrical device 290. For example, if the power conditioner 270 receives single phase AC power, the power conditioner 270 can generate 120V three phase AC power, which is sent to the electrical device 290. As described herein the power conditioned by the power conditioner 270 can be called conditioned power.

The electrical device 290 is electrically coupled to the power conditioner 270 or, if there is no power conditioner 270, to the power-transmitting section 282 of the tubing string 210. The electrical device 290 uses electric power (conditioned by the power conditioner 270) to operate and perform one or more functions within the wellbore 120. Examples of the electrical device 290 can include, but are not limited to, a motorized valve, a boiler, and a pump. For example, the electrical device 290 can be a pump assembly (e.g., pump, pump motor) that can pump, when operating, oil, gas, and/or production fluids from the wellbore 120 to the surface 102. The electrical device 290 can include a control system that controls the functionality of the electrical device 290. Such a control system can be communicably coupled with a user and/or some other system so that the control system can receive and/or send commands and/or data.

In certain example embodiments, a conductive interface 299 is disposed below the bottom isolator sub 1101 within the cavity of the casing 220. The conductive interface 299 can be electrically coupled to the electrical device 290. In such a case, the conductive interface 299 electrically couples the casing 220 to the tubing string 210. Thus, the casing 220 can be used as a return leg to complete the electric circuit that starts at the power source 260. The conductive interface 299 can be made of one or more of a number of electrically conductive materials. The conductive interface 299 can be a packer, a seal, an anchor assembly, or any other suitable device that can be placed within the wellbore 120.

A conventional interface at the conductive interface 299 may employ a design that ensures conductivity for the circuit. In certain example embodiments, the conductive interface 299 includes metallic (or otherwise electrically conductive) "teeth" that expand out to the casing 220 to anchor and seal the production area within the cavity 225. The anchoring or locating 'teeth' can establish the electrical current path, and special robust designs can be used in the practice of this invention.

Centralizing the tubing string 210 within the cavity 225 of the casing 210 may be a mechanical and/or electrical requirement for the operational use of example embodiments. A number of centralizers 230 can be disposed at various locations throughout the cavity 225 of the casing 220 between the casing 220 and the tubing string 210. In certain example embodiments, each centralizer 230 contacts both the outer surface of the tubing string 210 and the inner surface of the casing 220. Each centralizer 230 can have robust electrical insulation to prevent arc paths between the tubing string 210 and the casing 220.

Each centralizer 230 can be the same and/or different from the other centralizers 230 in the piping system 200. A centralizer 230 can be made of and/or coated with one or more of a number of electrically non-conductive materials. Thus, each centralizer 230 can provide an electrical separation between the tubing string 210 and the casing 220. In certain example embodiments, the centralizer 230 can provide a physical barrier within the cavity 225 of the casing 220 between the casing 220 and the tubing string 210.

Thus, the electrical circuit formed by the power source 260, the power-transmitting section 282 of the tubing string 210, the power conditioner 270, the electrical device 290, the conductive interface 299, and the casing 220 is not altered by arcing that can result between the tubing string 210 and the casing 220.

Figure 3:
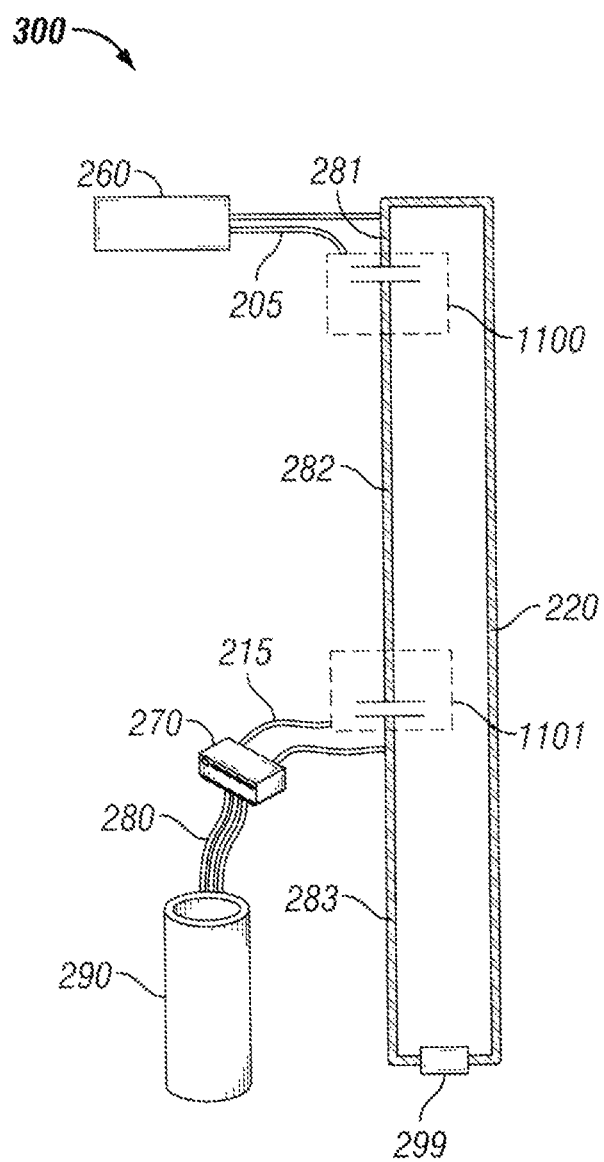
FIG. 3 shows an electrical schematic of an example piping system within a wellbore of a field in accordance with certain example embodiments.

FIG. 3 shows an electrical schematic 300 of the example piping system of FIG. 2, in accordance with certain example embodiments. Referring to FIGS. 1-3, the principal circuit in FIG. 3 originates with the power source 260, which sends power, using the cable 205, to the top portion of the top isolator sub 1100. The top isolator sub 1100 can create a dielectric, physical break between the top neutral section 281 and the power-transmitting section 282 of the tubing string 210. The power then is transmitted down the power-transmitting section 282 of the tubing string 210 to the cable 215, which feeds the power to the power conditioner 270. The cable 215 is coupled to the bottom of the bottom isolator sub 1101. In other words, the bottom isolator sub 1101 creates a dielectric, physical break between the bottom neutral section 283 and the power-transmitting section 282 of the tubing string 210. The power conditioner 270 can send power (or a portion thereof, such as a neutral leg), using cable 417, to the bottom neutral section 283 of the casing string 210.

The conductive interface 299 can provide an electrical bridge between the bottom neutral section 283 of the tubing string 210 and the casing 220. The casing 220 acts as an electrical ground and can be electrically coupled to the power source 260 to complete the primary circuit. A secondary circuit is also created by the power conditioner 270 by generating and sending conditioned power, using cable 280, to the electrical device 290. The power transmitted in the primary circuit of FIG. 3 can be single phase AC power, while the power used in the secondary circuit of FIG. 3 can be three-phase AC power.

Figure 4A:
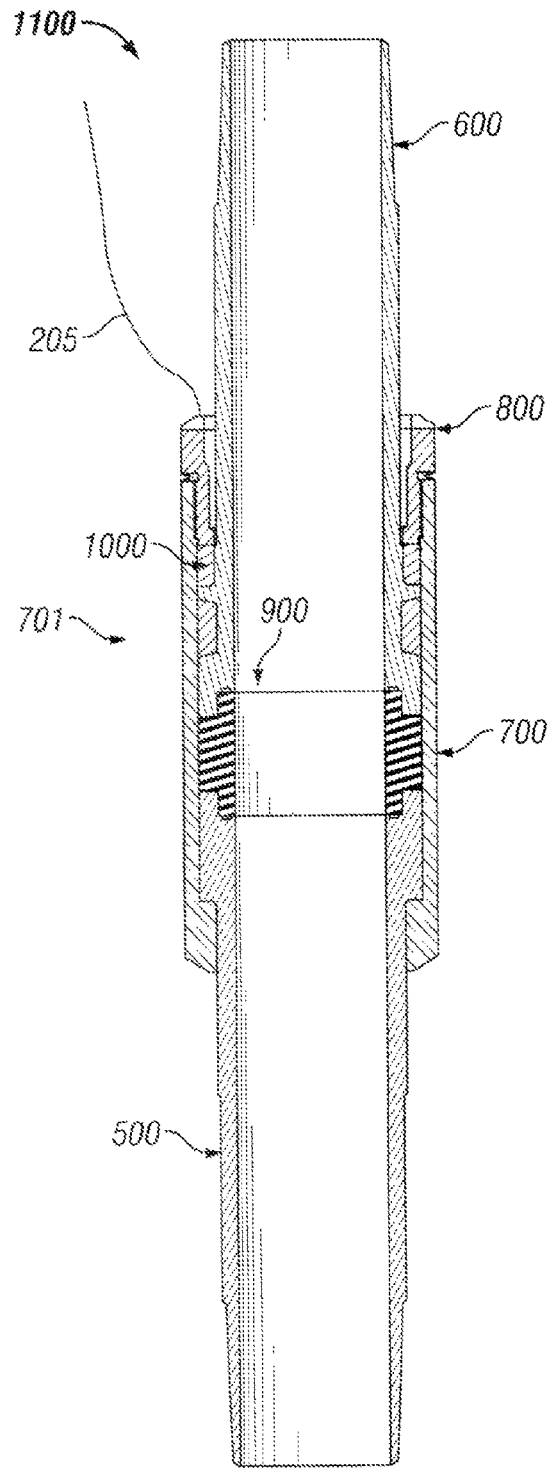
FIGS. 4A and 4B each shows an electrical schematic of an example isolator sub in accordance with one or more example embodiments.
Figure 4B:
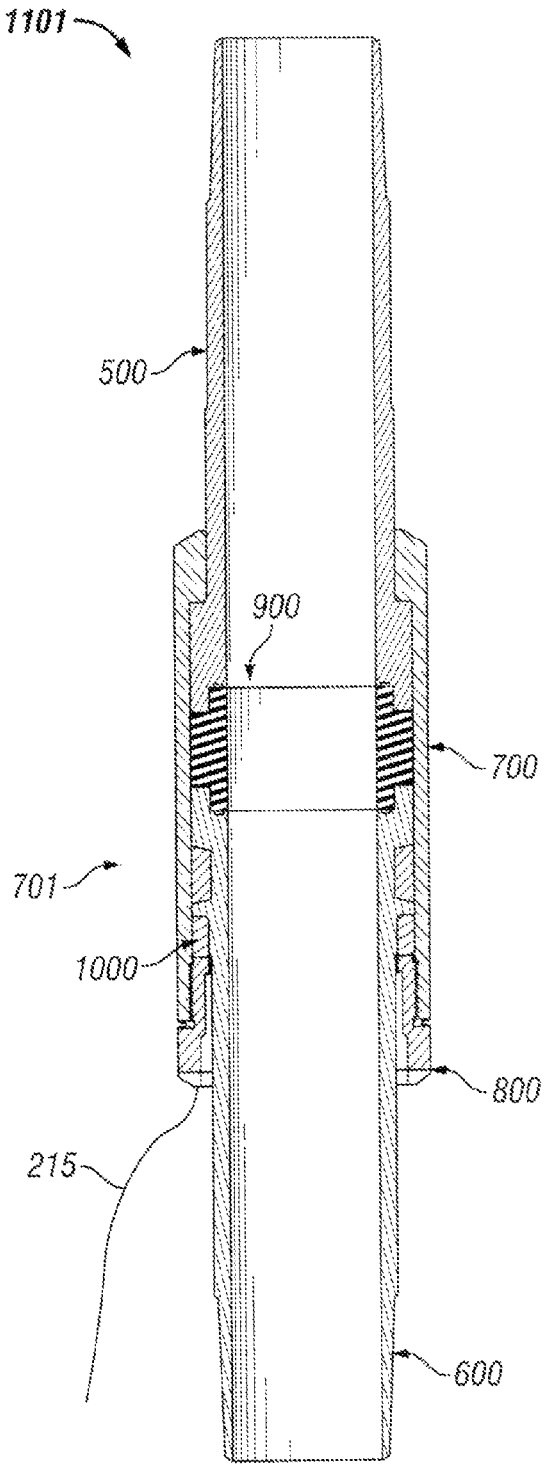

FIGS. 4A and 4B show an electrical schematic of an example isolator sub 1100 and isolator sub 1101, respectively, in accordance with one or more example embodiments. Referring to FIGS. 1-4B, each isolator sub can include a rod 500, a rod 600, and an outer housing 701. In FIG. 4A, the rod 500, the outer housing 701 (which includes the cylinder 700 and the end nut 800), all described below, are all electrically charged when power is transmitted from the power source 260 to within the wellbore 120. The electrical cable 205 that is coupled to the end nut 800 of the outer housing 701 is also electrically charged when power is transmitted from the power source 260 to within the wellbore 120. By contrast, the rod 600, also described below, is not electrically charged when power is transmitted from the power source 260 to within the wellbore 120.

According to the example embodiment shown in FIG. 4A, the power flows from the electrical cable 205, through the outer housing 701 (and, more specifically, from the end nut 800 to the cylinder 700), and finally through the rod 500. In this example, the rod 600 would be mechanically coupled to the top neutral section 281 of the tubing string 210, and the rod 500 would be mechanically coupled to the power-transmitting section 282 of the tubing string 210.

The isolator sub 1101 in FIG. 4B is inverted (upside-down) relative to the isolator sub 1100 in FIG. 4A. In this case, the power in FIG. 4B would flow from the rod 500, through the outer housing 701 (and, more specifically, from the cylinder 700 to the end nut 800), and finally through the electrical cable 215. In this example, the rod 600 would be mechanically coupled to the bottom neutral section 283 of the tubing string 210 and would be electrically neutral. The rod 500 would be mechanically coupled to the power-transmitting section 282 of the tubing string 210.

Figure 8A:
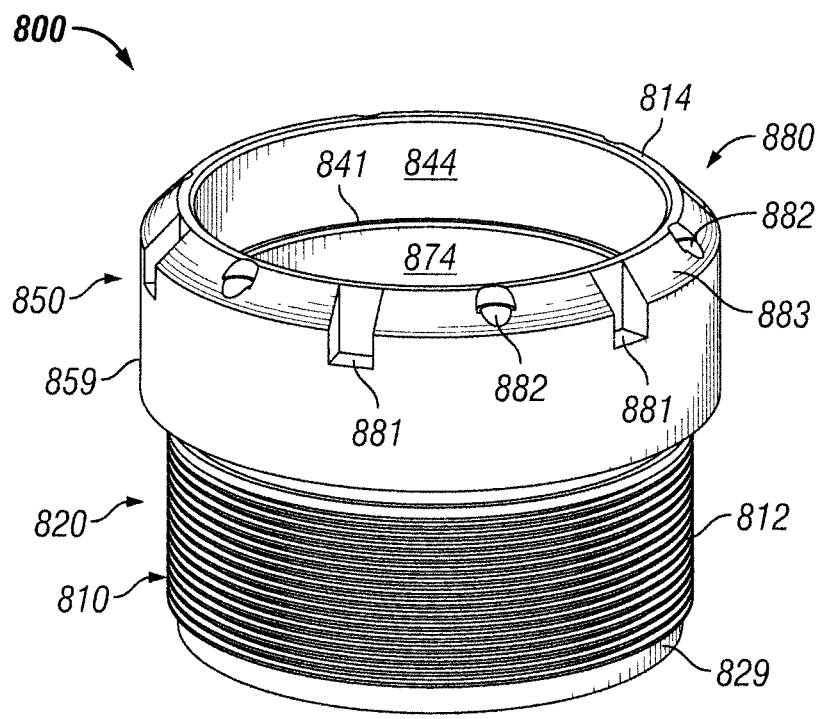
FIGS. 8A and 8B show various views of an end nut of an example isolator sub in accordance with one or more example embodiments.
Figure 8B:
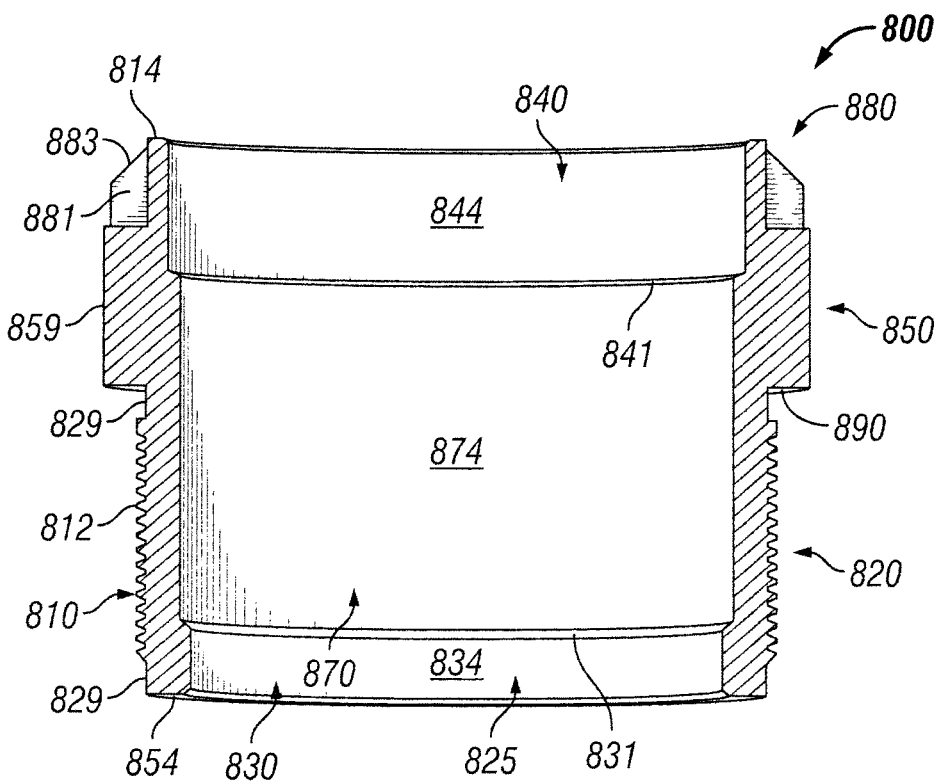
Figure 9A:
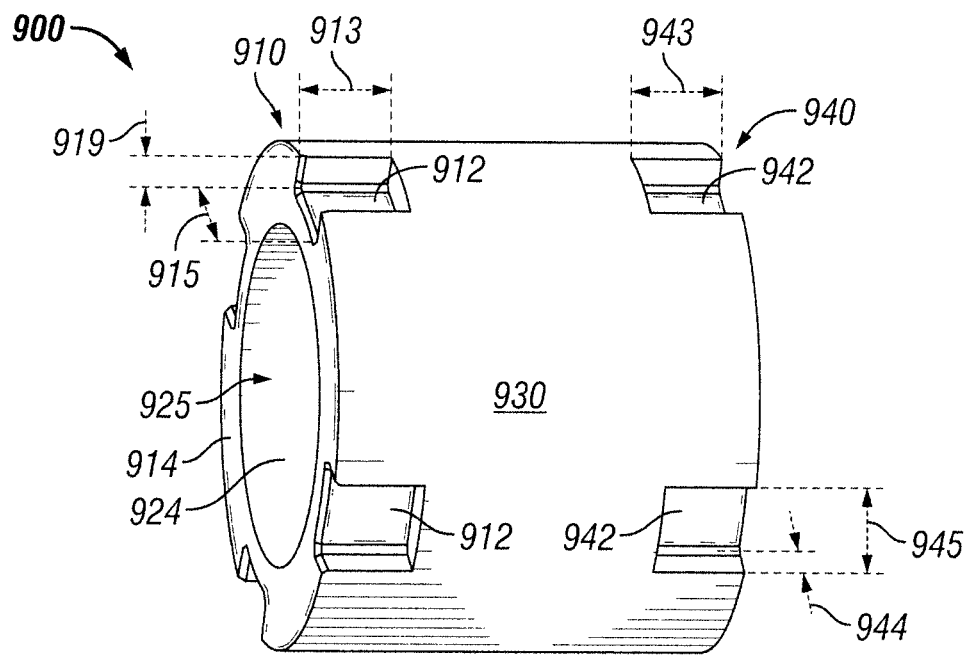
FIGS. 9A and 9B show various views of an example isolator sub in accordance with one or more example embodiments.
Figure 9B:
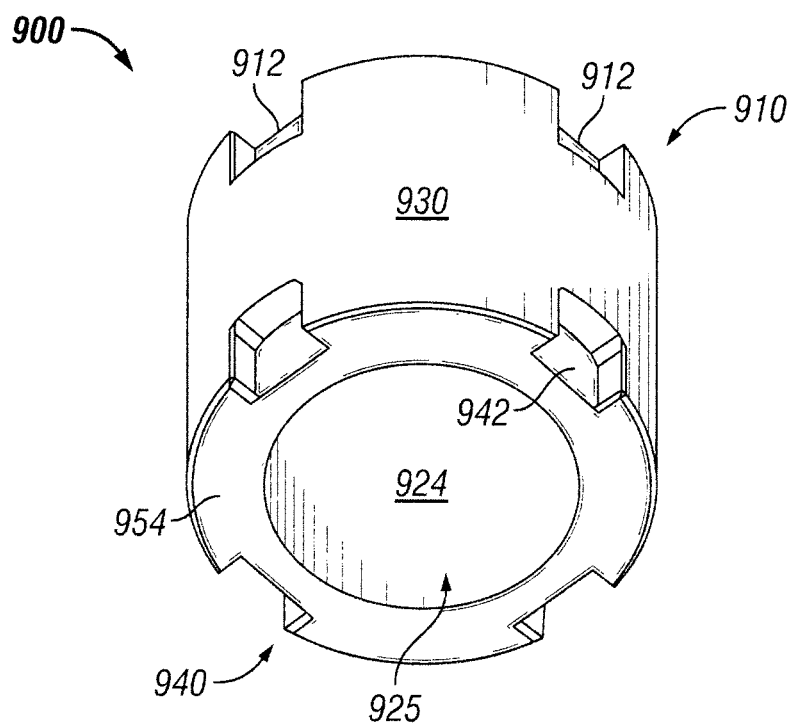
Figure 10:
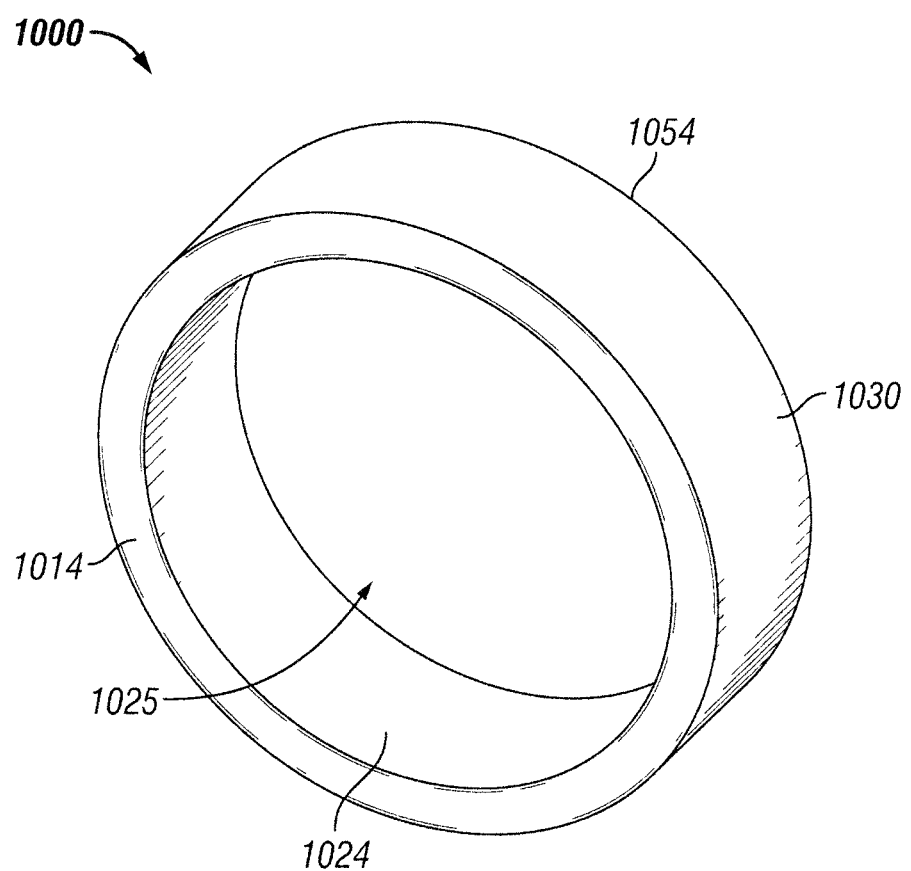
FIG. 10 shows a perspective view of a spacer of an example isolator sub in accordance with one or more example embodiments.

As discussed above, an example isolator sub (e.g., isolator sub 1100) is made of a number of components. A number of such components are described with respect to FIGS. 5A-10. Specifically, FIGS. 5A-5C show various views of the rod 500 in accordance with one or more example embodiments. FIG. 6 shows a side view of the rod 600 in accordance with one or more example embodiments. FIG. 7 shows a perspective cross-sectional side view of an outer cylinder 700 in accordance with one or more example embodiments. FIGS. 8A and 8B show various views of an end nut 800 in accordance with one or more example embodiments. FIGS. 9A and 9B show various views of an isolator 900 in accordance with one or more example embodiments. FIG. 10 shows a perspective view of a spacer 1000 in accordance with one or more example embodiments. In one or more embodiments, one or more of the features shown in FIGS. 5A-10 may be omitted, added, repeated, and/or substituted. Accordingly, embodiments of components of an isolator sub should not be considered limited to the specific arrangements of components shown in FIGS. 5A-10.

Referring to FIGS. 1-10, the rod 500 of FIGS. 5A-5C can include one or more sections. In this case, the rod 500 includes section 520, section 530, section 540, and section 550. Each section of the rod 500 can include at least one wall (also called a rod wall) that forms a cavity 525 throughout the length of the rod 500. In this case, section 520 has rod wall 529, section 530 has rod wall 539, section 540 has rod wall 549, and section 550 has rod wall 559. The outer perimeter of each rod wall can vary relative to the outer perimeter of the other rod walls of the rod 500. In this case, the outer perimeter of the rod wall 559 is less than the outer perimeter of the rod wall 549, which is less than the outer perimeter of the rod wall 539 which is less than the outer perimeter of the rod wall 529.

In certain example embodiments, the outer surface of each rod wall can be smooth (as shown in FIGS. 5A-5C) and/or include one or more of a number of features. For example, at the distal end 554 of the section 550 can be disposed one or more of a number of coupling features 570. In this case, the coupling feature 570 is mating threads 572 disposed on the outer surface 559 at the distal end of the section 550. The coupling feature 570 is configured to mechanically couple to a tubing pipe of the power-transmitting section 282 of the tubing string 210. In addition, or in the alternative, the coupling feature 570 can be disposed at one or more other locations (e.g., along the inner surface 524) on the rod 500.

As another example, at the proximal end 514 of the section 520 can be disposed one or more of a number of coupling features 510. In this case, the coupling feature 510 includes a number of extensions 512 that protrude beyond the proximal end 514 of the section 520. As in this example, each extension 512 can have substantially the same shape and size as the shape and size of the other extensions 512 of the coupling feature 510. Alternatively, an extension 512 can have a different shape and/or size as the shape and size of the other extensions 512 of the coupling feature 510.

Each extension 512 can have a depth 516, a width 511, and a height 513. A surface of an extension 512 can be flat, have a curvature, and/or have some other feature. The depth 516 of an extension 512 can be substantially the same as or different (in this case, less) than the thickness 522 of the rod wall 529 of section 520 of the rod 500. The distance 515 between adjacent extensions 512 can be varied or uniform throughout the coupling feature 510. In certain example embodiments, the configuration of the coupling feature 510 (which in this case includes such characteristics as the shape and size of each extension, the number of extensions, and the orientation of the extensions) can be substantially the same as one or more of the complementary coupling features 942 of the isolator 900, as described below with respect to FIGS. 9A and 9B.

Similarly, the transition between sections of the rod 500 can be seamless and/or include one or more of a number of features (e.g., coupling features). For example, the transition between section 520 and section 530 can include a coupling feature 521 in the form of a shelf. In such a case, the coupling feature 521 can be used to abut against a complementary coupling feature 740 of the cylinder 700, as described below with respect to FIG. 7.

The inner perimeter of each section of the rod 500 can be substantially the same as, or different than, the inner perimeter of the other sections of the rod 500. In this example, the inner perimeter of each section of the rod 500 is substantially uniform along the length of the rod 500, forming a single inner surface 524. Further, the inner surface 524 of each rod wall can be smooth (as shown in FIGS. 5A-5C) and/or include one or more of a number of features (e.g., coupling features).

The rod 600 of FIG. 6 can include one or more sections. In this case, the rod 600 includes section 620, section 630, section 640, and section 650. Each section of the rod 600 can include at least one wall (also called a rod wall) that forms a cavity 625 throughout the length of the rod 600. In this case, section 620 has rod wall 629, section 630 has rod wall 639, section 640 has rod wall 649, and section 650 has rod wall 659. The outer perimeter of each rod wall can vary relative to the outer perimeter of the other rod walls of the rod 600. In this case, the outer perimeter of the rod wall 659 is less than the outer perimeter of the rod wall 649, which is less than the outer perimeter of the rod wall 639 which is less than the outer perimeter of the rod wall 629.

In certain example embodiments, the outer surface of each rod wall of the rod 600 can be smooth (as shown in FIG. 6) and/or include one or more of a number of features. For example, at the distal end 654 of the section 650 can be disposed one or more of a number of coupling features 670. In this case, the coupling feature 670 is mating threads 672 disposed on the outer surface 659 at the distal end of the section 650. The coupling feature 670 is configured to mechanically couple to a tubing pipe of the top neutral section 281 (in the case of isolator sub 1100) or the bottom neutral section 283 (in the case of isolator sub 1101) of the tubing string 210. In addition, or in the alternative, the coupling feature 670 can be disposed at one or more other locations (e.g., along the inner surface) on the rod 600.

As another example, at the proximal end 614 of the section 620 can be disposed one or more of a number of coupling features 610. In this case, similar to the rod 500 of FIGS. 5A-5C, the coupling feature 610 includes a number of extensions 612 that protrude beyond the proximal end 614 of the section 620. As in this example, each extension 612 can have substantially the same shape and size as the shape and size of the other extensions 612 of the coupling feature 610. Alternatively, an extension 612 can have a different shape and/or size as the shape and size of the other extensions 612 of the coupling feature 610.

Each extension 612 can have a depth 616, a width 611, and a height 613. A surface of an extension 612 can be flat, have a curvature, and/or have some other feature. The depth 616 of an extension 612 can be substantially the same as or different than the thickness of the rod wall 629 of section 620 of the rod 600. The distance 615 between adjacent extensions 612 can be varied or uniform throughout the coupling feature 610. In certain example embodiments, the configuration of the coupling feature 610 (which in this case includes such characteristics as the shape and size of each extension, the number of extensions, and the orientation of the extensions) can be substantially the same as one or more of the complementary coupling features 912 of the isolator 900, as described below with respect to FIGS. 9A and 9B.

Another example of one or more features disposed on a rod wall is coupling feature 623 that extends from the rod wall 629 of section 620. The coupling feature 623 in this case is a protrusion that is shaped and positioned in such a way as to abut against the spacer 1000 when the end nut 800 is coupled to the cylinder 700, as shown in FIGS. 11A-11D below. As another example of a feature disposed on a rod wall of the rod 600, coupling feature 680 can be made up of protrusion 621 and protrusion 628, leaving channel 627 therebetween. The coupling feature 680 is shaped and positioned in such a way as to retain a spacer 1180, as shown in FIGS. 11A-11D below.

The cylinder 700, shown in FIG. 7, of the outer housing 701 can include one or more sections. In this case, the cylinder 700 includes section 720 and section 730. Each section of the cylinder 700 can include at least one wall (also called a cylinder wall) that forms a cavity 725 throughout the length of the cylinder 700. In this case, section 720 has cylinder wall 724, and section 730 has cylinder wall 734. The outer perimeter of each cylinder wall can be substantially the same as or vary relative to the outer perimeter of the other cylinder walls of the cylinder 700. In this case, the surface 729 of the outer perimeter of the cylinder wall 729 is substantially uniform along the length of the cylinder 700. Further, the outer surface 729 of the cylinder 700 (or each section, if the outer perimeter of one section is different from another) can be smooth (as shown in FIG. 7) and/or include one or more of a number of features (e.g., coupling features).

The inner perimeter of each section of the cylinder 700 can be substantially the same as, or different than, the inner perimeter of the other sections of the cylinder 700. In this example, the inner perimeter of section 730 (along surface 734) is less than the inner perimeter of section 720 (along surface 724). Further, each inner surface of the cylinder 700 can be smooth (as shown in FIG. 7) and/or include one or more of a number of features (e.g., coupling features). For example, at the proximal end 714 of the section 720 can be disposed one or more of a number of coupling features 710. In this case, the coupling feature 710 includes mating threads 712 that are disposed along the inner surface 724 of section 720. In certain example embodiments, the configuration of the coupling feature 710 (which in this case includes such characteristics as the slope of the threads, the width of the threads, the space between threads, and the distance that the threads are disposed along the inner surface 724 of section 720) can be substantially the same as one or more of the complementary coupling features 810 of the end nut 800, as described below with respect to FIGS. 8A and 8B.

Similarly, the transition between sections of the cylinder 700 can be seamless and/or include one or more of a number of features (e.g., coupling features). For example, the transition between section 720 and section 730 can include a coupling feature 740 in the form of a shelf. In such a case, the coupling feature 740 can be used to abut against a complementary coupling feature 521 of the rod 500, as described below with respect to FIGS. 5A-5C.

The end nut 800, shown in FIGS. 8A and 8B, of the outer housing 701 can include one or more sections. In this case, the end nut 800 includes section 820 and section 850 along the outer side of the end nut 800, and section 830, section 870, and section 840 along the inner side of the end nut 800. Each section along the inner side of the end nut 800 can include at least one wall (also called an end nut wall) that forms a cavity 825 throughout the length of the end nut 800. In this case, section 830 has end nut wall 834, section 870 has end nut wall 874, and section 840 has end nut wall 844. The inner perimeter of each section disposed along the inner side of the end nut 800 can be substantially the same as, or different than, the inner perimeter of the other sections disposed along the inner side of the end nut 800. In this example, the inner perimeter of section 830 (along surface 834) is less than the inner perimeter of section 870 (along surface 874), which is less than the inner perimeter of section 840 (along surface 844).

Each surface of a section along the inner side of the end nut 800 can be smooth (as shown in FIGS. 8A and 8B) and/or include one or more of a number of features (e.g., coupling features). Similarly, the transition between sections along the inner side of the end nut 800 can be seamless and/or include one or more of a number of features (e.g., coupling features). For example, the transition between section 840 and section 870 can include a coupling feature 841 in the form of a shelf. In such a case, the coupling feature 841 can be used to abut against a spacer 1170, as described below with respect to FIGS. 11A-11D. As another example, the transition between section 830 and section 870 can include a feature 831 in the form of a ramp. In such a case, the feature 831 can be used to increase the thickness of the end nut 800 between the outer surface 829 and inner surface 834. In such a case, a more evenly distributed force can be applied by the distal end 854 of the end nut 800 against the spacer 1000, as shown below with respect to FIGS. 11A-11D.

Each surface of a section along the outer side of the end nut 800 can be smooth and/or include one or more of a number of features (e.g., coupling features). For example, coupling feature 810 can be disposed on some or all of the outer surface 829 of section 820. In this case, the coupling feature 810 is mating threads. In certain example embodiments, the configuration of the coupling feature 810 (which in this case includes such characteristics as the slope of the threads, the width of the threads, the space between threads, and the distance that the threads are disposed along the outer surface 829 of section 820) can be substantially the same as one or more of the complementary coupling features 710 of the cylinder 700, as shown above with respect to FIG. 7.

As another example, at the proximal end 814 of section 850 of the end nut 800 shown in FIGS. 8A and 8B are one or more coupling features 882 disposed in the top surface 883. Such a coupling feature 882 can be used to mechanically couple, directly or indirectly, to one or more electrical cables (e.g., electrical cable 205, electrical cable 215). In this example, each coupling feature 882 can be a threaded aperture for receiving a bolt that is coupled to the end of an electrical cable. As yet another example, the proximal end 814 of section 850 of the end nut 800 can also include one or more features 880 used to tighten and/or loosen the end nut 800 relative to the cylinder 700. In this case, the features 880 are slots 881 that are used to receive a tool designed to apply torque to the end cap 800 to tighten and/or loosen the end cap 800 relative to the cylinder 700.

Similarly, the transition between sections along the outer side of the end nut 800 can be seamless and/or include one or more of a number of features (e.g., coupling features). For example, the transition between section 820 and section 850 can include a coupling feature 890 in the form of a shelf. In such a case, the coupling feature 890 can be used to abut against the distal end 714 of the cylinder 700 or a sealing member 1114, as shown below with respect to FIGS. 11A-11D.

In certain example embodiments, the isolator 900 of FIGS. 9A and 9B is made of an electrically non-conductive material (e.g., ceramic). The isolator 900 is configured to provide physical separation between rod 500 and rod 600. The isolator 900 can include at least one wall (also called an isolator wall) that forms a cavity 925 throughout the length of the isolator 900. In this case, the isolator wall has an inner surface 924 and an outer surface 930.

At one end 914 of the isolator 900 can be disposed a coupling feature 910 in the form of one or more of a number of recessed areas 912 disposed in the outer surface 930 of the isolator 900. One or more of the recessed areas 912 of the coupling feature 910 can be configured to receive one or more of the extensions 612 of the coupling feature 610 of the rod 600. Each recessed area 912 of the coupling feature 910 can have a depth 919, a width 915, and a height 913 that can substantially correspond to the depth 616, the width 611, and the height 613 of an extension 612 of the coupling feature 610.

At the end 954 opposite the end 914 of the isolator 900 can be disposed another coupling feature 940 in the form of one or more of a number of recessed areas 942 disposed in the outer surface 930 of the isolator 900. One or more of the recessed areas 942 of the coupling feature 940 can be configured to receive one or more of the extensions 512 of the coupling feature 510 of the rod 500. Each recessed area 942 of the coupling feature 940 can have a depth 944, a width 945, and a height 943 that can substantially correspond to the depth 516, the width 511, and the height 513 of an extension 512 of the coupling feature 510. The shape, size, number, position, and/or other characteristics of the coupling feature 940 can be substantially the same as, or different than, the coupling feature 910.

The spacer 1000 of FIG. 10 can be made of an electrically non-conductive material (e.g., ceramic). The spacer 1000 is configured to provide physical separation between the cylinder 700 and rod 600. The spacer 1000 can include at least one wall (also called a spacer wall) that forms a cavity 1025 throughout the length of the spacer 1000. In this case, the spacer wall has an inner surface 1024 and an outer surface 1030. The spacer 1000 can have a proximal end 1014 and a distal end 1054. The shape, size, and/or other characteristics of the proximal end 1014 and/or the distal end 1054 can be substantially the same as the shape, size, and/or other characteristics of the rod 600 (and, more specifically, the coupling feature 623 and the rod wall 629), the distal end 854 of the end nut 800, and surface 724 of the cylinder 700.

Figure 11A:
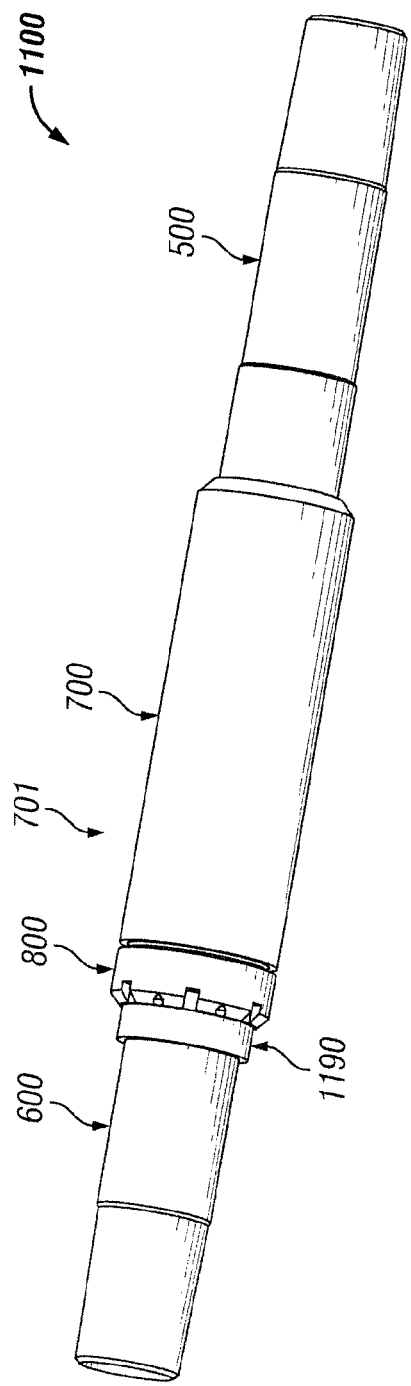
Figure 11B:
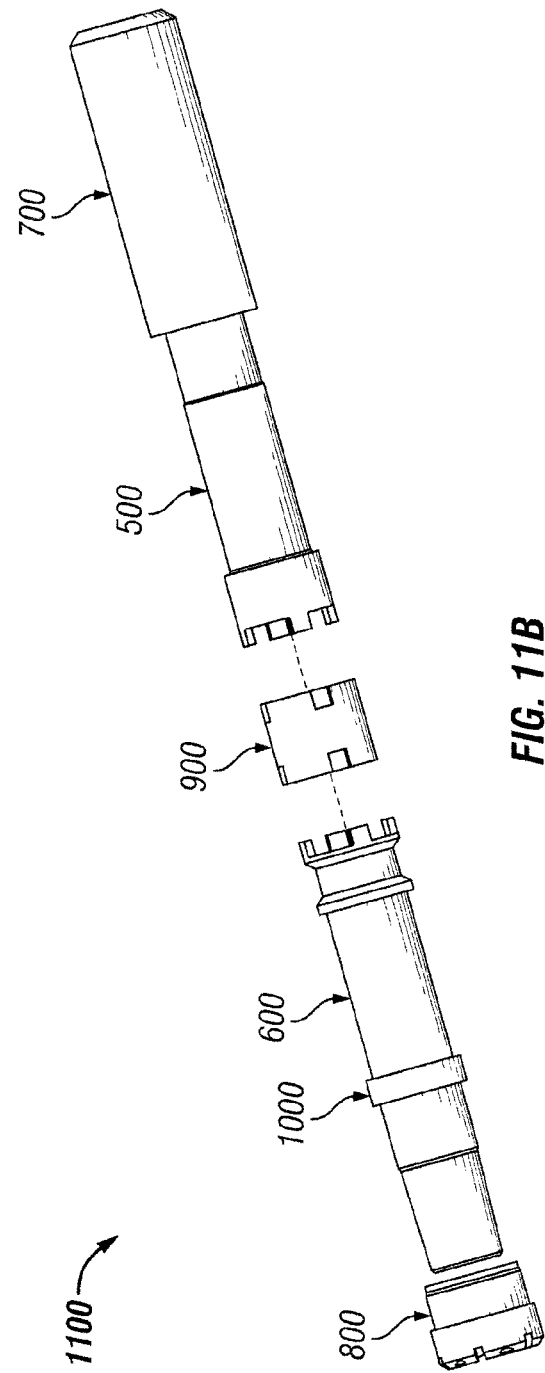

FIGS. 11A-11D show various views of the isolator sub 1100 of FIGS. 2-10 in accordance with one or more example embodiments. Specifically, FIG. 11A shows a side perspective view of the isolator sub 1100. FIG. 11B shows an exploded side view of the isolator sub 1100. FIGS. 11C and 11D each shows a cross-sectional side view of the isolator sub 1100. In one or more embodiments, one or more of the features shown in FIGS. 11A-11D may be omitted, added, repeated, and/or substituted. Accordingly, embodiments of an isolator sub should not be considered limited to the specific arrangements of components shown in FIGS. 11A-11D.

Referring now to FIGS. 1-11D, the example isolator sub 1100 can include the rod 500, the rod 600, the isolator 900, the outer housing 701 (including the cylinder 700 and the end nut 800), all as described above. In addition, the isolator sub 1100 can include an end cover 1190, a number of other spacers (e.g., spacer 1160, spacer 1170, spacer 1180), and a number of sealing members (e.g., sealing member 1110, sealing member 1111, sealing member 1112, sealing member 1113, sealing member 1114). In such a case, the various sealing members can reduce or eliminate the ingress of fluids and/or gases up to a pressure of approximately 15,000 psi. Such fluids and gases are one or more of a number of fluids and gases found within the wellbore 120 of the subterranean formation 110. Each sealing member can be device (e.g., o-ring, gasket) and/or sealant (e.g., silicone) that is elastic and is made of one or more of a number of suitable materials (e.g., rubber, plastic).

When the isolator sub 1100 is assembled, the isolator 900 is positioned between the rod 500 and the rod 600 in a linear arrangement forming a cavity 1125 that traverses the length of the rod 500, the isolator 900, and the rod 600. In certain example embodiments, the size of the cavity 1125 is substantially uniform throughout. In other words, the size of the cavity 525 of the rod 500, the size of the cavity 625 of the rod 600, and the size of the cavity 925 of the isolator 900 are substantially the same to each other. As described below, the isolator 900 is mechanically coupled to both the rod 500 and the rod 600. The coupling features of the isolator 900, the rod 500, and the rod 600 can allow the isolator 900 to withstand a torque of up to 2400 pound-feet. In other words, the coupling features of the isolator 900 can withstand torques experienced when making up and/or breaking up portions of the tubing string 210.

As shown in FIGS. 11A-11D, the outer housing 701 is disposed over the isolator 900, a portion of the rod 500, and a portion of the rod 600. The cylinder 700 is mechanically (in this case, using coupling feature 710) coupled to the coupling feature 810 of the end nut 800, and the cylinder 700 is also mechanically (in this case, using coupling feature 740) coupled to the coupling feature 521 of the rod 500. The inner surface 724 of the cylinder 700 can also abut against the surface outer 930 of the isolator 900 and one or more spacers (e.g., spacer 1000, spacer 1180). In such a case, the spacers can be positioned between the cylinder 700 and the rod 600.

The purpose of the various spacers (spacer 1000, spacer 1160, spacer 1170, spacer 1180) and the end cover 1190, which are all made of electrically non-conductive material, is to provide physical separation between the rod 600 and the outer housing 701. In other words, the rod 600 avoids direct electrical contact with the outer housing 701. Similarly, one of the purposes of the isolator is to provide physical separation between the rod 600 and the rod 500. In so doing, as explained above with respect to FIGS. 4A and 4B, the rod 600 remains electrically neutral while the end nut 800, the cylinder 700, and the rod 500 are electrically charged. In certain example embodiments, one or more air gaps (e.g., air gap 1120, air gap 1121, air gap 1122) can exist between the rod 600 and the outer housing 701.

In certain example embodiments, the isolator sub can be capable of supporting weight (in the form of tubing string, one or more other isolator subs, a power conditioner, an electrical device, and/or any other component of the piping system) in excess of 200,000 pounds. Further, example isolator subs can withstand extreme pressures (e.g., up to 15,000 pounds per square inch (psi)) and/or temperatures (e.g., approximately 625° F.).

Using example embodiments described herein, it is possible to use the existing metallic (or otherwise electrically conductive) structure of the constructed well as the electrical conductor set to supply energy for moderate to high power equipment that is located within a wellbore. For example, example embodiments may be employed to supply power of 100 KVA-1 MVA to an electrical device, although less or more power could be employed. Supply of power using existing wellbore hardware, such as a tubing string and casing, may reduce or eliminate the need for conventional power cabling completion insertions. The application of example embodiments may employ relatively high current and moderately high voltage use of the well structure.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An isolator sub for use in a wellbore of a subterranean wellbore of a subterranean formation, the isolator sub comprising:
  a first rod comprising at least one first rod wall forming a first rod cavity, wherein the first rod further comprises a first coupling feature disposed at a first end;
  a second rod comprising at least one second rod wall forming a second rod cavity, wherein the second rod further comprises a second coupling feature disposed at a first end, wherein the second rod is electrically conductive;
  an isolator comprises an electrically non-conductive material, at least one isolator wall, a first complementary coupling feature, and a second complementary coupling feature, wherein the at least one isolator wall forms an isolator cavity, wherein the first coupling feature couples to the first complementary coupling feature, and wherein the second coupling feature couples to the second complementary coupling feature; and
  an outer housing disposed around and coupled to the first rod, the second rod, and the isolator, wherein the outer housing is electrically conductive and comprises at least one third coupling feature, wherein the at least one third coupling feature is configured to electrically couple to an electrical cable,
  wherein the isolator physically separates the first rod and the second rod, and wherein the isolator prevents direct electrical and physical communication between the first rod and the second rod.

2. The isolator sub of claim 1, wherein the outer housing comprises:
  a cylinder comprising a first outer housing coupling feature; and
  an end nut mechanically coupled to the cylinder and comprising a second outer housing coupling feature, wherein the second outer housing coupling feature mechanically couples to the first outer housing coupling feature.

3. The isolator sub of claim 2, wherein the at least one third coupling feature is disposed on the end nut.

4. The isolator sub of claim 2, further comprising:
a spacer disposed between the cylinder, the end nut, and a spacer coupling feature disposed on the first rod, wherein the spacer is electrically non-conductive.

5. The isolator sub of claim 2, wherein the second rod further comprises a cylinder coupling feature that couples to a complementary cylinder coupling feature disposed on the cylinder.

6. The isolator sub of claim 1, wherein the first rod avoids direct electrical contact with the outer housing.

7. The isolator sub of claim 1, wherein the first rod cavity, the second rod cavity, and the isolator cavity form a continuous isolator sub cavity along an assembled length of the first rod, the isolator, and the second rod.

8. The isolator sub of claim 1, wherein the first rod cavity, the second rod cavity, and the isolator cavity each have a substantially uniform similar cross-sectional shape and size relative to each other.

9. The isolator sub of claim 1, wherein the first rod further comprises a first tubing coupling feature disposed at a second end, wherein the first tubing coupling feature is configured to mechanically couple to a first tubing pipe.

10. The isolator sub of claim 9, wherein the second rod further comprises a second tubing coupling feature disposed at a second end, wherein the second tubing coupling feature is configured to mechanically couple to a second tubing pipe.

11. The isolator sub of claim 10, wherein the second tubing pipe is electrically conductive, and wherein electrical power received by the outer housing from the electrical cable flows through the second rod to the second tubing pipe.

12. The isolator sub of claim 10, wherein the second tubing pipe is electrically conductive, and wherein electrical power received by the second rod from the second tubing pipe flows through the outer housing to the electrical cable.

13. The isolator sub of claim 1, wherein the isolator comprises at least one material that withstands high amounts of force, wherein the first complementary coupling feature and the second complementary coupling feature of the isolator can withstand a torque of approximately 2400 pound-feet during a field operation, wherein the torque is measured rotationally around a length of the isolator.

14. The isolator sub of claim 1, wherein the first rod is electrically non-conductive.

15. A system for applying power into a wellbore within a subterranean formation, the system comprising:
a casing disposed within the wellbore having a first cavity running therethrough, wherein the casing is electrically conductive;
a tubing string disposed within the first cavity, wherein the tubing string comprises a top neutral section positioned proximate to an entry point of the wellbore and a power-transmitting section positioned below the top neutral section;
a first isolator sub positioned between the top neutral section and the power-transmitting section of the tubing string, wherein the first isolator sub comprises:
a first rod mechanically coupled to the top neutral section, wherein the first rod comprises a first coupling feature disposed at a first distal end;
a second rod mechanically coupled to the power-transmitting section, wherein the second rod comprises a second coupling feature disposed at a second proximal end, wherein the second rod is electrically conductive;
a first isolator comprises an electrically non-conductive material, a first complementary coupling feature and a second complementary coupling feature, wherein the first coupling feature couples to the first complementary coupling feature, and wherein the second coupling feature couples to the second complementary coupling feature; and
a first outer housing coupled to the first rod, the second rod, and the first isolator, wherein the outer housing is electrically conductive and comprises at least one third coupling feature;
a power source positioned above the entry point and electrically coupled to the outer housing using the at least one third coupling feature; and
an electrical load electrically coupled to the power-transmitting section of the tubing string and disposed within the wellbore,
wherein the isolator physically separates the first rod and the second rod, and wherein the isolator prevents direct electrical and physical communication between the first rod and the second rod.

16. The system of claim 15, further comprising:
a second isolator sub positioned between a bottom neutral section and the power-transmitting section of the tubing string, wherein the first isolator sub comprises:
a third rod mechanically coupled to the bottom neutral section of the tubing string, wherein the third rod comprises a fourth coupling feature disposed at a third distal end;
a fourth rod mechanically coupled to the power-transmitting section, wherein the fourth rod comprises a fifth coupling feature disposed at a fourth proximal end, wherein the fourth rod is electrically conductive;
a second isolator comprises the electrically non-conductive material, a fourth complementary coupling feature, and a fifth complementary coupling feature, wherein the fifth coupling feature couples to the fifth complementary coupling feature, and wherein the fourth coupling feature couples to the fourth complementary coupling feature; and
a second outer housing coupled to the third rod, the fourth rod, and the second isolator, wherein the outer housing is electrically conductive and comprises at least one sixth coupling feature,
wherein the second isolator sub is inverted relative to the first isolator sub.

17. The system of claim 15, wherein the wellbore reaches a pressure of approximately 15,000 pounds per square inch.

18. The system of claim 15, wherein the power-transmitting section of the tubing string weighs approximately 200,000 pounds.

19. The system of claim 15, wherein the wellbore has an ambient temperature of approximately 625° F.

20. The system of claim 15, wherein the wellbore contains hydrogen sulfide.

* * * * *